Nov. 7, 1950  R. G. PAULETTE ET AL  2,528,907
CLARIFIER
Filed Oct. 25, 1946  2 Sheets-Sheet 1
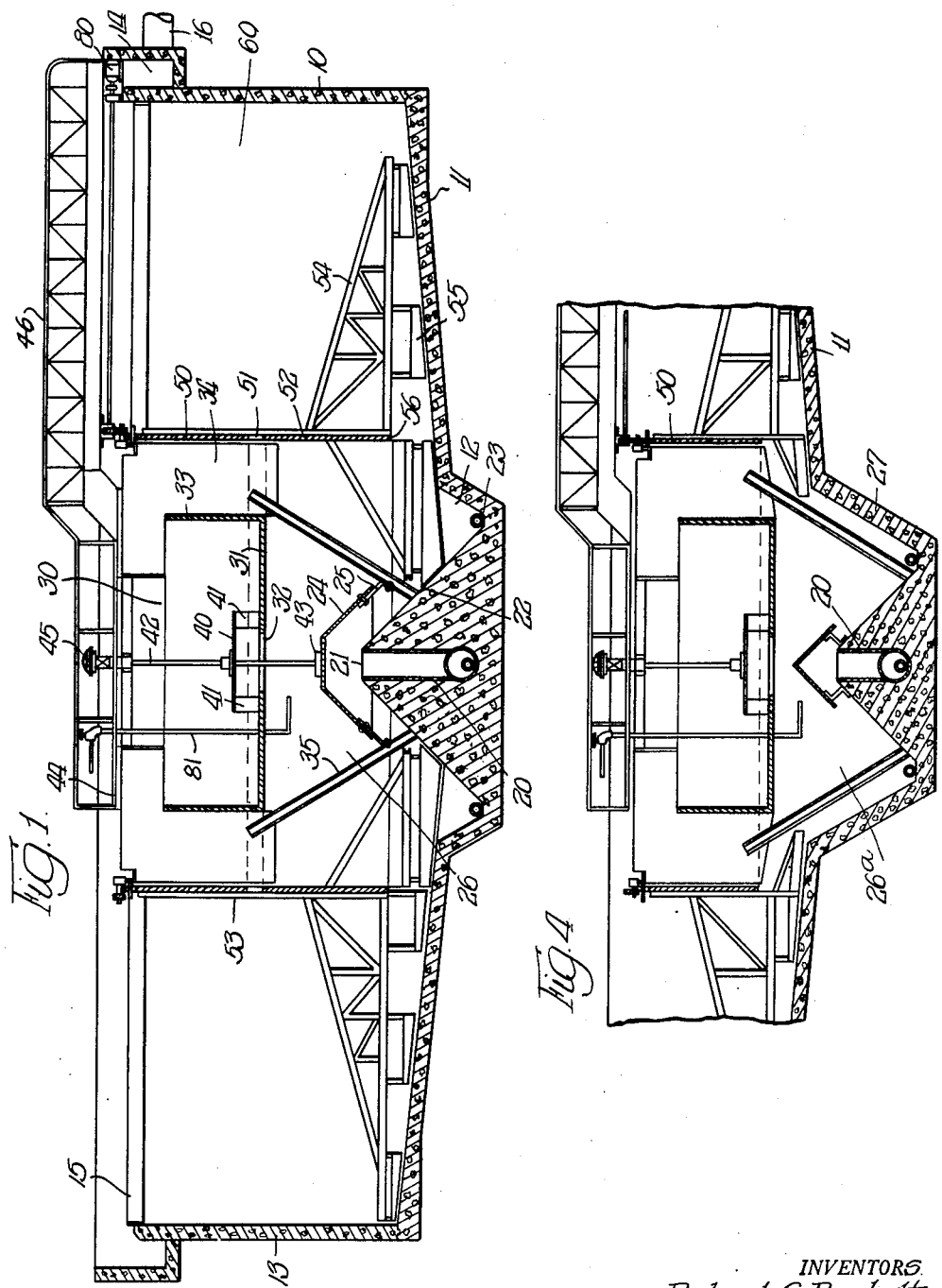
INVENTORS
Robert G. Paulette,
BY Walter H. Gregn,

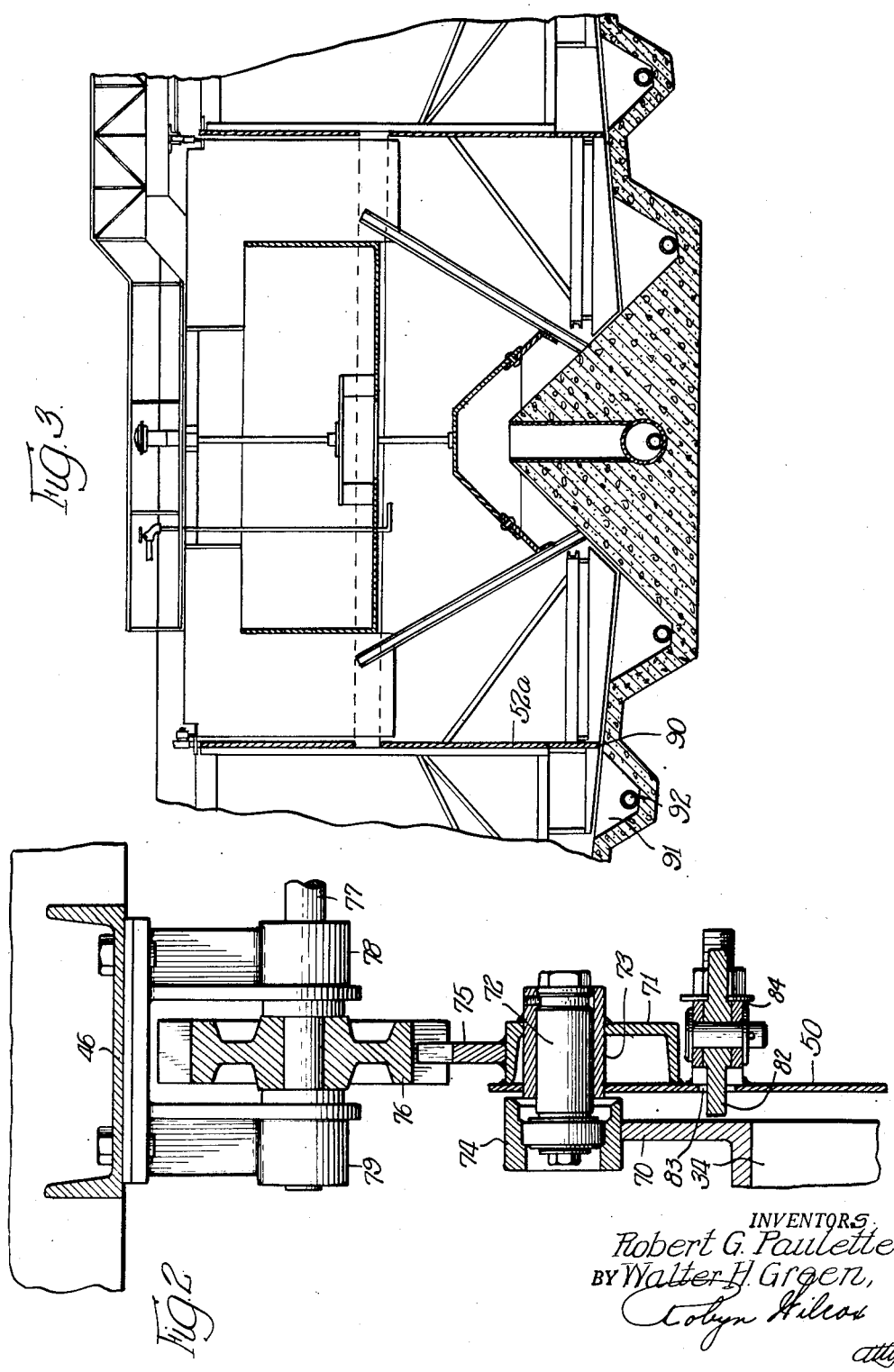

Patented Nov. 7, 1950

2,528,907

UNITED STATES PATENT OFFICE 2,528,907

CLARIFIER

Robert G. Paulette, Buffalo, N. Y., and Walter H. Green, Geneva Township, Kane County, Ill., assignors to Infilco Incorporated, Chicago, Ill., a corporation of Delaware Application October 25, 1946, Serial No. 705,762

12 Claims. (Cl. 210—16)

This invention relates to a clarifying apparatus in which solids are separated from a liquid-solids suspension by sedimentation.

A primary object of this invention is to provide an improved clarifying apparatus, and one in which a more efficient use of the space within the basin is secured.

Another object of this invention is to provide a sedimentation chamber particularly adapted to the separation of solids from a liquid-solids mixture in which a large portion of the solids are very heavy and settle very rapidly and substantially all of the balance of the solids is very light and settles with considerable difficulty. A specific application of this invention relates to an apparatus in which a large portion of the solids contained in the liquid occurs in the form of sand, which will settle completely from the liquid in a period of a few minutes, while the balance of the solids is an extremely light material, which will settle only with difficulty, and then not satisfactorily unless treated by a flocculation process or the like.

A still further object of this invention is to provide an apparatus for a three-stage treatment of a liquid-solids mixture: first by the rapid sedimentation of the heavy solids, such as sand; followed by the flocculation of the lighter solids; and finally by the sedimentation of the flocculated solids.

These and other objects of this invention will be apparent from the description and claims which follow.

Heretofore it has been customary in the clarification of liquid-solids suspensions to treat the entire volume of the mixture by a process which was designed to satisfactorily remove the lightest and most fragile particles. There are many kinds of suspensions in which a large portion of the solids content is extremely heavy and readily settleable and the balance is light and very difficult to remove. Heretofore it has been customary to either treat in separate basins (one to provide a sedimentation basin for the removal of the heavy solids and the second for flocculation of the lighter solids and the subsequent sedimentation of the flocculated particles) or to treat all of the liquid in the flocculation basin with a coagulant followed by settling of all solids therefrom. Both methods of treatment are wasteful and expensive: the first because it requires two large and expensive basins and their associated solids removal apparatus and the second because it requires a large apparatus with a heavy scraping device and also uses a large amount of coagulant. The apparatus of my invention combines in a single structure, of relatively small size, a suitable apparatus for separating both types of solids and requires only the amount of coagulant necessary for the removal of the lighter solids.

We may mention, as an example of the type of liquid which our invention is particularly adapted to treat, a waste liquor from a glass factory which has the following characteristics:

| | Lbs. per 1,000 gallons |
|---|---|
| Emery powder | 0.35 |
| Plaster | 7.83 |
| Iron powder | 1.74 |
| Glass | 22.95 |
| Sand | 136.25 |
| Rouge | .35 |
| Felt fiber | .05 |

The solids constitute roughly 5% (by volume) of the waste water, and of these solids 80% settle out in five minutes. The remaining solids are very difficult to settle, the supernatant having a turbidity of well over 500 parts per million (P. P. M.) after 30 minutes of quiescent settling and nearly 100 P. P. M. after three hours of quiescent settling. However, the supernatant, when treated with two grains of alum per gallon, gives a water of sparkling clarity after a few minutes settling.

Briefly, our apparatus comprises a clarification basin having a liquid inlet discharging into a relatively small compartment, or primary sedimentation zone, that may have a total retention time of only 5 or 10 minutes, this compartment preferably being centrally located adjacent the floor of the basin; a relatively small flocculating compartment, preferably located above and in direct communication with the primary sedimentation chamber; and a relatively large sedimentation chamber, preferably the annular portion of the basin; and a solids scraper mechanism particularly adapted for this structure. The invention will readily be understood from a consideration of the drawings which form a part hereof.

Figure 1 represents a vertical cross sectional view of one preferred embodiment of our invention.

Figure 2 is an enlarged detail, partly in cross section, of the supporting and driving mechanism for the solids scraper.

Figure 3 represents a partial vertical cross sectional view of another form of our invention.

Figure 4 represents a partial vertical cross sectional view of a third form of our invention.

Our invention utilizes a tank, or basin, 10, similar in shape to known apparatus, as is shown in Figure 1, although it usually will be smaller than heretofore customary for treating equal quantities of water. Such a basin has a floor 11 sloping to a solids collection sump 12 and a substantially vertical side wall 13. Usually such tanks are circular or square, with a solids collecting sump near the center of the floor. It is also usual to withdraw treated and clarified liquid through a launder 14 which surrounds the top portion of side wall 13 and which is separated from the interior of the basin 10 by overflow weir 15. An effluent conduit 16 conveys the treated liquid from the launder 14.

We prefer to introduce the liquid-solids mixture through a centrally located and vertically discharging inlet pipe 20. Most of the heavy solids will deposit close to the inlet pipe so that it is preferable to have relatively large solids collecting sumps adjacent the inlet. For this purpose we extend the inlet 20 to a level somewhat above the level of the floor as at 21 and surround the inlet pipe with a steeply sloping conical fill 22, at the base of which cone is the solids collecting sump, or sumps, 12. Obviously the solids collecting sump may take the form of a large chamber which may extend entirely around the inlet fill 22, or of a plurality of small sumps, as may be desired. A solids outlet pipe 23 leads from the lower portion of the sump 12. Directly above the inlet 20 is a deflecting hood 24 supported by any suitable means such as legs 25. The purpose of the hood 24 is to direct the inflowing mixture downwardly over the sloping fill 22, and spread it over an inlet or primary sedimentation space 26.

Adjacent the inlet or primary sedimentation portion 26 of the basin is a flocculating chamber 30, which can be formed by any suitable structure. We prefer, in view of the saving of space which can be secured thereby, to place the flocculating chamber 30 directly above the primary sedimentation, or inlet, zone 26, as shown in the drawings. The flocculating chamber may be formed by a floor 31 having a centrally located inlet port 32 and a cylindrical side wall 33. Attached to the side wall 33 are a plurality of vertically extending radial baffles 34, which may be extended inwardly over the top of the wall 33, as shown. The flocculating chamber 30 and baffles 34 may be supported above the inlet space 26 by any suitable means, such as standards 35.

Within the flocculating chamber is a flocculating mechanism, preferably the rotor shown. The rotor comprises a horizontally extending plate or frame 40 having a plurality of radially extending blades 41 suspended from the underside thereof. Preferably the blades are relatively narrow (in the dimension which is radial to the tank) and are placed with the inner edges adjacent the sides of the inlet port 32. The rotor is mounted on a shaft 42. The lower end of the shaft may be journaled in a suitable bearing 43, shown in Figure 1 is mounted on top of the hood 24, or it may terminate at the rotor as shown in Figure 4. Supported on the vertical baffles 34 may be a floor 44, which is valuable as a means for supporting chemical feeders, not shown, and the driving motor 45 which is attached to the shaft 42 of the rotor. A suitable walkway 46 may extend from the wall of the basin to the central floor, as shown.

Surrounding the baffles 34 is a cylindrical draft tube 50 extending from above the level of the weir 15 downwardly to adjacent the floor of the basin. At an intermediate elevation of the basin, preferably adjacent the lower end of the baffles 34, is an outlet port 51. The port 51 might be a series of ports in a single draft tube but preferably is a slot between two cylinders of similar diameter such as upper draft tube 50 and the lower cylinder 52, as shown. The lower cylinder 52 is supported in alignment with said upper draft tube in vertically spaced relation with respect thereto by means of a plurality of angles 53, extending downwardly therealong from the top of said outer draft tube. Said angles may be secured to the outside of said outer draft tube and to the outside of said lower cylinder in a suitable manner, such as welding, to suspend said lower cylinder from said outer draft tube.

Mounted on the draft tube or draft tubes is a scraper mechanism for moving solids deposited on the floor of the basin to the solids collecting sump. As is well known in the art, the scraper mechanism may comprise a truss 54 to which truss is attached a number of scraper blades 55, as shown in the figures. As shown in the drawings, the scraper mechanism may also extend inwardly from the draft tube 52, so that solids in the initial sedimentation zone are pushed to the sumps as well as the solids in the annular, or secondary, sedimentation space. In some installations, as when the sump 12 extends entirely around the inlet pipe 20, the inner portion of the solids scraper will not be necessary. In Figure 1 the lower draft tube 52, as shown, is terminating at a level 56 somewhat above the floor so that solids collected in the outer annular portion or final sedimentation chamber 60 of the basin can be scraped into the sump 12, which lies within the draft tube 52 which encloses the inlet space, or primary sedimentation zone 26.

Various forms of supporting means for the driving structure and the attached solids scraping truss 54 from the draft tubes 50 and 52 can be suggested by those skilled in the art. However, we prefer to use a form such as shown in enlarged detail in Figure 2. Mounted on the peripheral edges of the radial baffles 34 is a circular rail 70. Extending around and welded to the outer side of the upper draft tube at the edges of its flanges and adjacent the upper end thereof is a channel 71. A plurality of shafts 72 extend inwardly of said draft tube and are journaled in bearings 73, which are rigidly supported at spaced points by the draft tube 50 and the channel 71, as shown. Mounted on the inner ends of shaft 72 are wheels 74 which ride upon the rail 70. A plurality of guide rollers 82, extend through slots 83, formed in said draft tube for engagement with the outer side of said circular rail, to guide said draft tube during rotatable movement thereof. Said guide rollers are suitably mounted for rotation about vertical axes in brackets 84, extending outwardly from said draft tube. A circular rack 75 is rigidly secured to the top of the channel 71 and is engaged by a pinion 76 mounted on a shaft 77, one end of which is supported in bearings 78 and 79 suspended from the bridge or walkway 46. The shaft 77 is driven by a motor 80 which may be placed in any suitable location, such as on the side wall 13, as shown in Figure 1. It will be obvious that the draft tubes and associated solids scrapers are supported by the wheels which ride on rail 70 and the structure is driven at suitable speed by the motor 80, whereby solids deposited on the floor of the basin 10 will be moved to the solids sump 12.

The structure shown and described divides the basin 10 into three separate chambers, or zones, in which the three steps of the process are carried out. The liquid-solids mixture enters the initial or primary sedimentation zone 26, which is preferably located, as shown, in the lower central portion of the basin. This space or chamber is enclosed within the circular draft tube 52 and below the floor 31 of the flocculation chamber 30. The entering mixture is deflected downwardly by the hood 24 and then flows upwardly toward the port 32 in the flocculating chamber 30, the relatively heavy solids depositing from such flow into the sump 12, from which they are periodically removed through the pipe 23. The volume of the initial chamber 26 can be of any desired size to secure the removal of the heavy and readily settleable particles. In the instance above mentioned a detention time of about 10 minutes was found to be larger than really necessary, for the heavy particles settled in such space with considerable rapidity. The space required for such initial settling takes only a small portion of the basin and when arranged as preferred occupies a space in which sedimentation of fine solids would not take place.

After the few minutes required to pass through the initial settling space 26, the liquid passes through the port 32 into the flocculating chamber 30. The entering liquid is dosed with a coagulant or flocculating chemical, introduced through chemical feed pipe 81, which for purposes of illustration is shown as discharging immediately below the port 32. The rotor of the type shown and described has a high pumping capacity coupled with non-turbulent mixing suitable for a flocculation process. It is contemplated that the rotor will be operated at a speed sufficient to pump an amount of liquid considerably in excess of the inflow of liquid into the basin, so that it will pump into the flocculating zone 30 not only the liquid entering the initial zone 26 but also a large amount (perhaps even two or more times the inflow of raw water) of the liquid which has passed from the flocculating zone 30 and is passing downwardly inside of the draft tube 50. This design and operation also prevents short circuiting of the liquid from the primary settling zone 26 out through the slot or port 51. Also the return of liquid containing flocculated particles assists in the flocculation of new particles so that the solids formed are denser and settle more readily. The mixture of initially treated water and chemical and recirculated liquid passes through the port 32 into the flocculation zone 30 where it is gently rotated and stirred by the rotor. This action permits the ready agglomeration of the small flocs into readily settleable particles. The liquid then overflows the walls of the flocculating chamber 30 and into the space enclosed by the draft tube 50. The radial baffles 34 still the rotation of the liquid and a throughput portion passes through the slot or port 51 into the outer portion, or final sedimentation chamber 60. The flocculated particles settle in the final settling chamber 60 and the clarified water flows over the weir 15 into the launder 14. The settled solids deposited in the annular chamber 60 are scraped into the solids sump 12 by the rotation of scraper blades 55.

It will be seen that this construction promotes the deposit of the heavy solids adjacent the center of the basin and their slide into the sump by gravity, so that little or no torque is required for scraping solids in the initial zone. On the other hand, while the area of the annular chamber is much greater, the solids deposited there are relatively light so that no great torque is applied to the peripheral ends of the truss 54. Thus by initially depositing the heavy solids at the center, the apparatus is not only reduced in size, but the weight of the scraper structure is considerably less than heretofore thought necessary.

The apparatus of Figure 3 is essentially the same as that of Figure 1. The principal difference is that the lower draft tube 52a extends downwardly to immediately adjacent the floor of the basin as shown at 90. In this embodiment a plurality of solids sumps 91 are located in the floor adjacent and outside of the draft tube 52a. A solid outlet 92 leads from these sumps as shown. This structure separately removes the two types of solids, which in many cases may have no great importance as often neither type of solids are reused in the process, nor elsewhere. However, in some instances it may be desirable to separate the two kinds of solids as the first or heavier portion may be reused. The construction shown in Figure 3 also has the advantage of guarantying that there can be no short circuiting of initially treated water into the space 60 by flowing under the bottom of the lower draft tube.

Figure 4 shows an embodiment particularly adapted for relatively shallow basins. In this form the initial sedimentation space 26a is sunk below the floor 11, as by the sloping floor 27. In this form one draft tube only, i. e., the upper draft tube 50 may be required. This draft tube will terminate somewhat above the floor 11 and the flocculated liquid issuing from the spaces between the vertical baffles 34 will pass under the draft tube and rise toward the outlet launder 14. The solids deposited from the flocculated liquid will come to rest on floor 11 of the basin and will be scraped into the initial sedimentation space 26a from which all solids will be removed as desired.

It is believed obvious that the apparatus of our invention may be varied somewhat from the forms shown in the drawings, as modifications will be apparent to those skilled in the art after considering our invention. The three embodiments shown are therefore to be considered as illustrative of our invention but not a limitation of the scope thereof.

We claim:

1. A liquid treating apparatus comprising a basin, a partition structure within said basin dividing the space therein into a relatively small space and a relatively large final sedimentation space, a treated liquid outlet from the upper part of said large space, a second partition structure in said small space dividing same into a lower initial sedimentation space and a superposed flocculating space, an inlet for liquid to be treated discharging into said initial sedimentation space, an inlet into said flocculation space from said initial sedimentation space, an outlet from said flocculating space to said large sedimentation space, means for flocculating liquid in said flocculating space, a solids scraper movable along the floor of said large sedimentation space, means for discharging solids from said basin to waste, and means for driving said solids scraper.

2. A liquid treating apparatus comprising a basin, a vertically extending wall structure at the central portion of said basin dividing said basin into an inner space and an outer final sedimentation space, a partition structure in said inner space dividing such space into an initial sedimentation space and a superposed flocculating space, an inlet opening into said flocculating space from said initial sedimentation space, said flocculating space being in open communication with said outer space, an inlet for liquid to be treated discharging into said initial sedimentation space, a rotor in said flocculating space, means for rotating said rotor, a solids collecting sump in said basin, an outlet from said sump, a solids scraper in said outer space adapted to move solids to said sump, a treated liquid outlet from the upper part of said outer space, and means for driving said solids scraper.

3. In a liquid treating apparatus, a basin having a treated liquid outlet from the upper part thereof, a vertical wall structure dividing said basin into an inner space and an outer final sedimentation space, a partition structure in an upper part of said inner space, said partition structure forming within said inner space a lower initial sedimentation space and an upper flocculating chamber, an inlet for the liquid to be treated discharging into said initial sedimentation space, a deflecting baffle associated with said inlet and disposed beneath said flocculating chamber, a port in said partition structure affording communication from said initial sedimentation space into said flocculating chamber, a rotor in said flocculating chamber and associated with said port, means for rotating said rotor, a flow passage leading from the top of said flocculating chamber to said port, and an outlet from said flow passage into said final sedimentation space.

4. A liquid treating apparatus comprising a basin having a treated liquid outlet from its upper part, a vertical wall structure extending downwardly within said basin from above the level of said outlet and terminating adjacent the floor of said basin and dividing said basin into an inner space and an outer final sedimentation space, a partition structure spaced inwardly of said wall structure in an upper part of said inner space, said partition structure having a bottom and forming a flocculating chamber in said upper part, the lower part of said inner space providing an initial quiescent sedimentation space, an inlet delivering liquid to be treated to said initial sedimentation space, a port in said bottom of said partition structure affording communication from said initial sedimentation space into said flocculating chamber, a flow passage leading from the upper part of said flocculating chamber to said final sedimentation space, a rotor mounted in said flocculating chamber in association with said port, means for rotating said rotor, the pumping capacity of said rotor being sufficient to establish a circulation of liquid from the top of said flocculating chamber through said port, a sump in the floor of said basin, an outlet from said sump, a solids scraper mechanism mounted for movement over the floor of said basin, and means to rotatably drive said solids scraper mechanism to push solids depositing on the floor of said basin into said sump.

5. A liquid treating apparatus comprising a basin having a treated liquid outlet from its upper part, a vertical wall structure extending downwardly within said basin from above the level of said outlet and terminating adjacent the floor of said basin and dividing said basin into an inner space and an outer final sedimentation space and having an outlet opening from said inner space at an intermediate level thereof, a partition structure in an upper part of said inner space, said partition structure having a bottom and forming in said space an upper flocculating chamber and a lower initial sedimentation space disposed therebeneath, an inlet for liquid to be treated discharging into said initial sedimentation space, a deflecting baffle interposed between said inlet and said flocculating chamber, a port in the bottom of said partition structure affording communication from said initial sedimentation space into said flocculating chamber, a flow passage leading from the top of said flocculating chamber to said outlet opening in said wall structure and being in open communication with said port, a rotor mounted in said flocculating chamber, means for rotating said rotor, a sump adjacent said inlet, an outlet from said sump, a solids scraper mechanism mounted for movement over the floor of said basin, and means to rotatably drive said solids scraper mechanism to push solids depositing on the floor of said basin into said sump.

6. A liquid treating apparatus including a basin having a treated liquid outlet from the upper part thereof, a partition structure extending downwardly from a level beneath the level of said liquid outlet and terminating at a level disposed above the floor of said basin and having a bottom spaced above the floor of said basin and forming an open topped flocculating chamber, a port in the bottom of said chamber, a rotor mounted in said chamber in association with said port and so constructed and arranged as to pump liquid into said chamber, means for rotating said rotor, a plurality of vertical baffles extending outwardly from said chamber, a cylindrical draft tube surrounding said baffles and dividing said basin into an inner space and an outer space, said inner space including said flocculating chamber and an initial sedimentation space disposed therebeneath, and said outer space providing a final sedimentation space, an inlet for liquid to be treated discharging into said inner initial sedimentation space, a deflector associated with said inlet and arranged to direct incoming liquid away from said port, a flow passage from said flocculating chamber to said final sedimentation space, a solids sump adjacent said inlet, a solids scraper mechanism mounted for movement along the floor of said basin and so constructed and arranged as to push solids depositing on the floor of said basin into said solids sump, and means to rotate said scraper mechanism.

7. A liquid treating apparatus including a basin having a treated liquid outlet from the upper part thereof, a partition structure extending downwardly from a level beneath the level of said liquid outlet and having a bottom spaced above the floor of said basin and forming an open topped flocculating chamber, a port in the bottom of said chamber affording communication into said chamber, a plurality of vertical baffles extending outwardly from said chamber, a cylindrical draft tube surrounding said baffles and dividing said basin into an inner space and an outer final sedimentation space, said inner space including said flocculating chamber, an initial sedimentation space subjacent said flocculating chamber and a passageway from the upper portion of said flocculating chamber in open communication with said port, an outlet from said passageway through said draft tube to said outer space, a liquid inlet for liquid to be treated discharging into said inner initial sedimentation space, a deflector associated with said inlet, a rotor in said flocculating chamber so constructed and arranged as to pump liquid from said passageway through said port, means for driving said rotor, a solids sump adjacent said inlet, another solids sump outside of said draft tube, a solids scraper mechanism mounted for movement along the floor of said basin and so constructed and arranged as to push solids into said sumps, outlets from said sumps, and means to rotate said solids scraper mechanism.

8. A liquid treating apparatus comprising a basin having a treated liquid outlet from the upper part thereof and a sump recessed beneath the bottom of said basin, an outlet from said sump, a partition structure within said basin having a vertically extending portion terminating at its upper end below the level of said outlet and having a horizontally extending bottom portion vertically spaced above the floor of said basin, thereby forming an open topped chamber spaced above the floor of said basin, a port in said bottom affording communication with the space beneath said chamber, a draft tube surrounding said partition structure and extending downwardly within said basin from a level above the level of said liquid outlet, and forming within said basin an inner initial sedimentation space beneath said chamber and an outer final sedimentation space, an inlet discharging liquid to be treated into said initial sedimentation space, and a flow passageway affording communication from the space within said draft tube to the space without said draft tube at a level above said initial sedimentation space, a pump in said chamber including a mechanically driven rotor so constructed and arranged so as to pump liquid into said chamber in excess of the liquid discharged into said initial sedimentation space through said inlet, and means for driving said pump.

9. A liquid treating apparatus comprising a basin, a treated liquid outlet from the upper part of said basin, a draft tube extending upwardly from a level adjacent the floor of said basin to above the level of said outlet, said draft tube dividing said basin into an inner space and an outer final sedimentation space and having an open portion providing a passageway from said inner to said outer space, a partition structure disposed within said draft tube, said partition structure having a bottom forming the floor of a flocculation chamber enclosed within said partition structure, and the top of an initial sedimentation space in the lower part of said inner space, an inlet discharging into said initial sedimentation space, a port in said floor of said flocculation chamber affording communication from said initial sedimentation space into said flocculation chamber, a flow passage from the upper part of said flocculation chamber through said open portion of said draft tube to said final sedimentation space, a pump associated with said port and so constructed and arranged as to pump liquid into said flocculation chamber in excess of that discharged into said initial sedimentation space through said inlet, means for driving said pump, and a solids outlet from the lower portion of said basin.

10. A liquid treating apparatus comprising a basin, a treated liquid outlet from the upper part of said basin, a draft tube extending upwardly from closely adjacent the floor of said basin to above the level of said outlet, said draft tube dividing said basin into an inner space and an outer final sedimentation space, and having an open portion providing a passageway from said inner to said outer space, a partition structure disposed within said draft tube, said partition structure having a bottom and forming within said inner space a lower initial sedimentation space and a flocculation chamber disposed thereabove, an inlet discharging into said initial sedimentation space, a port in said bottom affording communication from the space surrounding said inlet into said flocculation chamber, a rotor associated with said port and so constructed and arranged as to pump liquid into said flocculation chamber in excess to that discharged through said inlet into said initial sedimentation space, means for driving said rotor, and a solids outlet from the floor of said basin.

11. A liquid treating apparatus comprising a basin having a treated liquid outlet from the upper part thereof and a solids sump recessed beneath the floor of said basin, a partition structure within said basin having a vertically extending wall terminating at its upper end below the level of said outlet and having a bottom rigidly mounted in vertically spaced relation with respect to the floor of said basin, thereby forming an open topped flocculating chamber, a port in said floor affording communication with the space beneath said chamber, a draft tube surrounding said partition structure, and dividing said basin into an inner space and an outer final sedimentation space, said inner space including said flocculating chamber and an initial sedimentation space beneath said chamber, an inlet discharging liquid to be treated upwardly above the bottom of said basin into said initial sedimentation space, a deflecting baffle interposed between said inlet and said port, a mechanically driven rotor associated with said port and so constructed and arranged as to pump liquid into said chamber in excess of the liquid discharged through said inlet into said initial sedimentation space, and a flow passageway from the upper part of said flocculation chamber to said port, and an outlet from said passageway to said final sedimentation space.

12. A liquid treating apparatus comprising a basin having a floor on which solids settle from the liquid undergoing treatment, means for removing settled solids from said floor and withdrawing them from said basin, a treated liquid outlet from an upper part of said basin, a wall structure separating in said basin an inner initial sedimentation space in which heavier solids will deposit, from an outer final sedimentation space, a passageway affording communication between the spaces within and without said wall structure, an inlet for liquid to be treated discharging into said initial sedimentation space, a flocculation chamber within the inner space and having a floor at a level spaced above the level of said inlet, a port in said floor, a rotor in said flocculation chamber, means for driving said rotor, said passageway being in open communication with the top of said flocculation chamber and said rotor being of such capacity as to pump liquid in excess of the throughput, whereby flocculated liquid is returned from the top of said flocculation chamber to said port and mixed with liquid that has undergone primary sedimentation in said initial sedimentation space.

ROBERT G. PAULETTE.
WALTER H. GREEN.

(References on following page)

REFERENCES CITED

The following references are of record in the file of this patent:

UNITED STATES PATENTS

| Number | Name | Date |
|---|---|---|
| 2,268,726 | Tark | Jan. 6, 1942 |
| 2,289,112 | Fischer | July 7, 1942 |
| 2,296,437 | Green | Sept. 22, 1942 |
| 2,365,293 | Robinson | Dec. 19, 1944 |
| 2,391,697 | Green | Dec. 25, 1945 |
| 2,400,598 | Prager | May 21, 1946 |
| 2,411,390 | Prager | Nov. 19, 1946 |
| 2,419,004 | Bieker et al. | Apr. 15, 1947 |
| 2,427,092 | Kamp | Sept. 9, 1947 |
| 2,427,886 | Walker | Sept. 23, 1947 |
| 2,429,315 | Green | Oct. 21, 1947 |